(12) United States Patent
Lee (10) Patent No.: US 8,949,020 B2
(45) Date of Patent: Feb. 3, 2015

(54) MAP-MATCHING APPARATUS USING PLANAR DATA OF ROAD, AND METHOD FOR SAME

(75) Inventor: Jungho Lee, Gyeonggi-do (KR)

(73) Assignee: Thinkwaresystems Corp., Seoul (KR)

( * ) Notice: Subject to any disclaimer, the term of this patent is extended or adjusted under 35 U.S.C. 154(b) by 134 days.

(21) Appl. No.: 13/262,031

(22) PCT Filed: Mar. 15, 2010

(86) PCT No.: PCT/KR2010/001599
§ 371 (c)(1),
(2), (4) Date: Jan. 10, 2012

(87) PCT Pub. No.: WO2010/114239
PCT Pub. Date: Oct. 7, 2010

(65) Prior Publication Data
US 2012/0101718 A1     Apr. 26, 2012

(30) Foreign Application Priority Data
Mar. 31, 2009  (KR) .................. 10-2009-0027409

(51) Int. Cl.
*G01C 21/00*  (2006.01)
*G01C 21/30*  (2006.01)
*G01C 21/32*  (2006.01)
*G01C 21/34*  (2006.01)

(52) U.S. Cl.
CPC ................ *G01C 21/30* (2013.01); *G01C 21/32* (2013.01); *G01C 21/3453* (2013.01)
USPC ............................ 701/409; 701/411; 701/415

(58) Field of Classification Search
CPC ..... G01C 21/30; G01C 21/32; G01C 21/3453
USPC .......................................... 701/409, 411, 415
See application file for complete search history.

(56) References Cited

U.S. PATENT DOCUMENTS

| | | | | |
|---|---|---|---|---|
| 5,477,458 A * | 12/1995 | Loomis | ........................ | 701/471 |
| 5,488,378 A * | 1/1996 | Colley | ..................... | 342/357.25 |
| 5,644,318 A * | 7/1997 | Janky et al. | ............... | 342/357.31 |
| 5,751,245 A * | 5/1998 | Janky et al. | ................ | 342/357.4 |
| 5,774,826 A * | 6/1998 | McBride | ....................... | 701/489 |
| 5,848,373 A * | 12/1998 | DeLorme et al. | ............ | 701/455 |
| 5,991,689 A * | 11/1999 | Aito et al. | ...................... | 701/416 |
| 6,016,118 A * | 1/2000 | Jackson et al. | .......... | 342/357.29 |
| 6,061,628 A * | 5/2000 | Hayashi et al. | ............... | 701/411 |
| 6,385,540 B1 * | 5/2002 | Ajima | .......................... | 701/469 |
| 6,577,334 B1 * | 6/2003 | Kawai et al. | .................. | 348/148 |
| 6,674,434 B1 * | 1/2004 | Chojnacki et al. | ............ | 345/428 |
| 7,336,078 B1 * | 2/2008 | Merewether et al. | ......... | 324/326 |
| 7,548,753 B2 * | 6/2009 | Millard et al. | ............. | 455/456.5 |
| 7,855,683 B2 * | 12/2010 | Razoumov et al. | ........... | 342/458 |
| 2002/0130953 A1* | 9/2002 | Riconda et al. | ............... | 348/115 |

(Continued)

FOREIGN PATENT DOCUMENTS

| | | | | |
|---|---|---|---|---|
| EP | 0661553 A2 * | 7/1995 | ................ | G01S 5/02 |
| EP | 1 182 611 | 2/2002 | | |

*Primary Examiner* — Calvin Cheung
(74) *Attorney, Agent, or Firm* — Occhiuti & Rohlicek LLP (57) ABSTRACT

A map matching apparatus and method are provided. The map matching apparatus comprises a location determining unit configured to determine whether a GPS receipt location is located within planar data for a road, and a map matching unit configured to perform map matching on the GPS receipt location depending on whether the GPS receipt location is located within the planar data.

20 Claims, 9 Drawing Sheets

(56) References Cited

U.S. PATENT DOCUMENTS

| | | |
|---|---|---|
| 2003/0036849 A1* | 2/2003 | Ford et al. ............... 701/213 |
| 2003/0048218 A1* | 3/2003 | Milnes et al. ........... 342/357.07 |
| 2003/0182052 A1* | 9/2003 | DeLorme et al. ........... 701/201 |
| 2004/0220731 A1* | 11/2004 | Tucker et al. .............. 701/213 |
| 2004/0267448 A1* | 12/2004 | Kano et al. ............... 701/209 |
| 2005/0075116 A1* | 4/2005 | Laird et al. ............. 455/456.3 |
| 2005/0107946 A1* | 5/2005 | Shimizu et al. ............ 701/207 |
| 2005/0149259 A1* | 7/2005 | Cherveny et al. ........... 701/208 |
| 2005/0197755 A1* | 9/2005 | Knowlton et al. ............ 701/50 |
| 2005/0246088 A1* | 11/2005 | Doherty et al. ............. 701/80 |
| 2005/0264404 A1* | 12/2005 | Franczyk et al. ............ 340/441 |
| 2006/0022048 A1* | 2/2006 | Johnson ................... 235/462.1 |
| 2006/0041372 A1* | 2/2006 | Kubota et al. .............. 701/200 |
| 2006/0041556 A1* | 2/2006 | Taniguchi et al. ............ 707/10 |
| 2006/0105795 A1* | 5/2006 | Cermak et al. .............. 455/518 |
| 2007/0093955 A1* | 4/2007 | Hughes ................... 701/200 |
| 2007/0124027 A1* | 5/2007 | Betzitza et al. ............... 701/1 |
| 2008/0004804 A1 | 1/2008 | Fujita et al. |
| 2008/0077314 A1* | 3/2008 | Ishikawa ................... 701/117 |
| 2008/0079723 A1* | 4/2008 | Hanson et al. .............. 345/427 |
| 2009/0021367 A1* | 1/2009 | Davies .................... 340/539.1 |
| 2009/0096884 A1* | 4/2009 | Schultz et al. ............ 348/222.1 |
| 2009/0167513 A1* | 7/2009 | Hill et al. .................. 340/435 |
| 2009/0171529 A1* | 7/2009 | Hayatoma .................. 701/36 |
| 2009/0171581 A1* | 7/2009 | Ushida et al. ............... 701/211 |
| 2009/0326809 A1* | 12/2009 | Colley et al. ............... 701/208 |
| 2010/0114416 A1* | 5/2010 | Au et al. .................... 701/23 |
| 2010/0195445 A1* | 8/2010 | Calhoun ................... 367/127 |
| 2010/0284572 A1* | 11/2010 | Lukas et al. ................ 382/107 |
| 2010/0332118 A1* | 12/2010 | Geelen et al. ............... 701/201 |
| 2011/0282578 A1* | 11/2011 | Miksa et al. ............... 701/208 |
| 2013/0328861 A1* | 12/2013 | Arikan et al. ............... 345/419 |

\* cited by examiner

MAP-MATCHING APPARATUS USING PLANAR DATA OF ROAD, AND METHOD FOR SAME

CROSS REFERENCE TO RELATED APPLICATIONS

This application is the national stage entry under 35 USC 371 for PCT/KR2010/001599, filed Mar. 15, 2010, which claims the benefit of the Mar. 31, 2009 priority date of Korean application 10-2009-0027409. The contents of both the foregoing applications are incorporated herein by reference.

BACKGROUND

1. Field

The embodiments of this document are directed to a navigation system, and more specifically to a map matching apparatus and method for performing map matching on a GPS receipt location.

2. Related Art

In general, navigation systems provide information helpful for driving a vehicle using a satellite.

A navigation system includes a GPS (global positioning system) module that receives a GPS signal from a GPS satellite and calculates a location of a vehicle based on the GPS signal.

The navigation system provides map data in which GPS receipt locations are map-matched to roads and guides a path requested by a user using the map data. The map data includes line data having a number of interpolation points (hereinafter, also referred to as "linear data"). For the conventional GPS systems, a map matching scheme is used that matches GPS receipt locations to the linear data.

Figure 1:
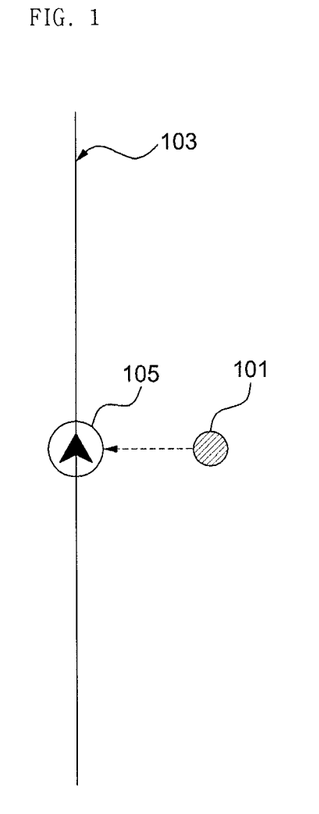
FIG. 1 is a view illustrating a method of map-matching GPS receipt locations to the linear data.

FIG. 1 is a view illustrating a method of map-matching GPS receipt locations to the linear data.

Referring to FIG. 1, a GPS receipt location 101 may have a distance error amounting to a few tens of meters due to characteristics of the GPS signal, and often departs from a road.

The navigation system forces the GPS receipt location 101 to match a location 105 corresponding to a road 103 that is located closest to the GPS receipt location 101 and puts a mark at the location 105 to indicate the location of the vehicle.

Figure 2:
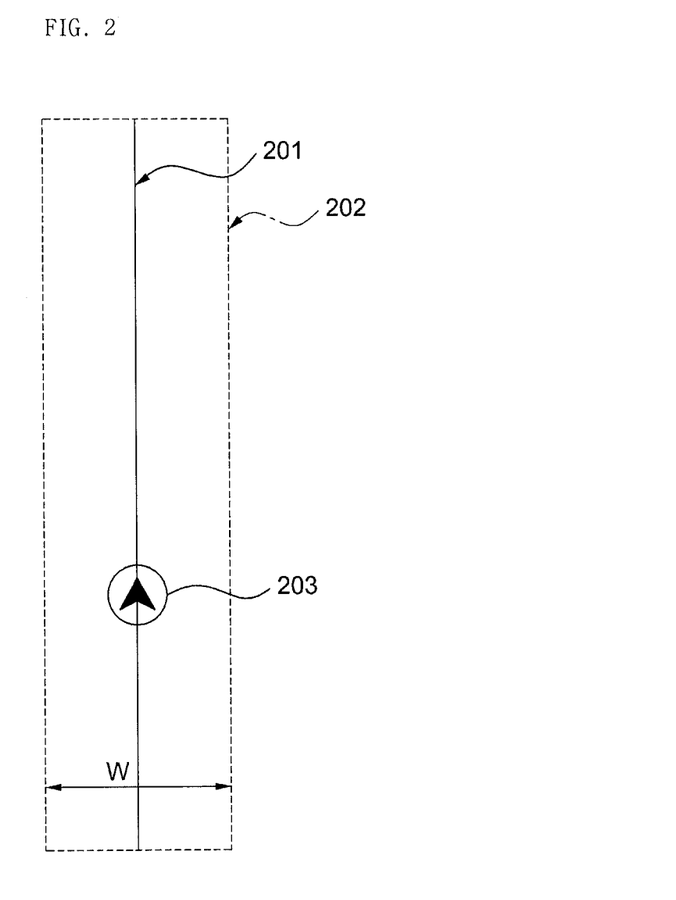
FIG. 2 is a view illustrating data for displaying linear data.

FIG. 2 is a view illustrating data for displaying linear data. Referring to FIG. 2, to provide the linear data 201 as a map image, the linear data 201 is transformed to planar data which is represented as a plane in consideration to a width W of the road.

The planar data 202 may provide a more realistic map image rather than the linear data 201. However, while the map image uses the planar data 202, the GPS receipt location is subjected to map matching based on the linear data 201. Accordingly, the mark 203 ends up being positioned at a center or central line of the road. Thus, it is required to enhance such a map matching scheme.

The navigation system may differentially constitute linear data for each lane and performs mapping of the GPS receipt locations considering the linear data for each lane. However, when the linear data is not differentiated for each lane, an error may occur at a broad road or toll gate to match the GPS receipt locations to other adjacent roads.

Figure 3:
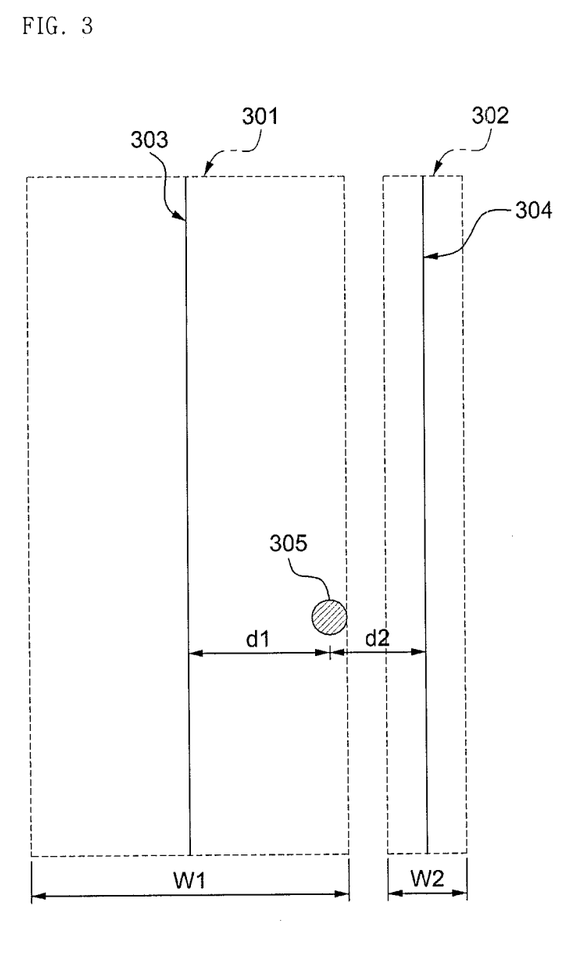
FIG. 3 is a view for describing an exemplary map matching error.

For purposes of illustration, as shown in FIG. 3, a highway 301 having a broad width W1 and a road 302 having a narrow width W2 are adjacent to each other and a vehicle drives on the highway 301. The navigation system calibrates the GPS receipt location 305 to linear data of a road closest to the GPS receipt location 305 among roads around the GPS receipt location 305.

However, when a distance d2 between the GPS receipt location 305 and the linear data 304 for the road 302 is closer to a distance d1 between the GPS receipt location 305 and the linear data 303 for the highway 301, although the vehicle travels on the highway 301 and the GPS receipt location 305 is located within the width W1 of the highway 301, an error may occur that matches the GPS receipt location 305 to the road 302.

Such a map matching error causes it difficult to perform a normal path guidance and deteriorates users' reliability. Accordingly, there is a need for an enhanced map matching scheme that fits a navigation system with high GPS receipt and displaying performance.

SUMMARY

The embodiments of this document provide a map matching apparatus and method using planar data for roads, which may enhance map matching performance for GPS receipt locations.

According to an embodiment of this document, there is provided a map matching apparatus comprising a location determining unit configured to determine whether a GPS receipt location is located within planar data for a road, and a map matching unit configured to perform map matching on the GPS receipt location depending on whether the GPS receipt location is located within the planar data.

According to an embodiment of this document, there is provided a map matching method performed by a map matching apparatus comprising a location determining unit and a map matching unit, the method comprising determining whether a GPS receipt location is located within planar data for a road by the location determining unit, and perform map matching on the GPS receipt location depending on whether the GPS receipt location is located within the planar data by the map matching unit.

According to the embodiments, map matching performance may be enhanced by performing map matching for GPS receipt locations using planar data for roads, thus minimizing map matching errors in the navigation system and enhancing users' reliability.

BRIEF DESCRIPTION OF THE DRAWINGS

The implementation of this document will be described in detail with reference to the following drawings in which like numerals refer to like elements.

DETAILED DESCRIPTION

Hereinafter, embodiments of this document will be described in detail with reference to the accompanying drawings, wherein the same reference numbers may be used to denote the same or substantially the same elements throughout the specification and the drawings.

Figure 4:
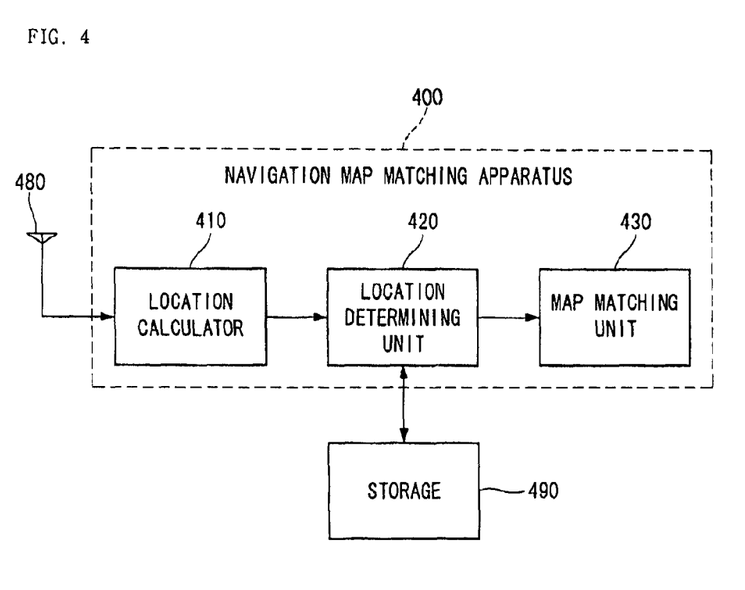
FIG. 4 is a block diagram illustrating an inner structure of a map matching apparatus using planar data for roads according to an embodiment of this document.

FIG. 4 is a block diagram illustrating an inner structure of a map matching apparatus using planar data for roads according to an embodiment of this document.

A map matching apparatus using planar data for roads according to an embodiment includes a GPS receiver 480, a storage 490, and a map matching unit 400.

The GPS receiver 480 includes a GPS module and receives a GPS signal from a GPS satellite. The received GPS signal is used to produce location on a location of a vehicle (also referred to as "location of GPS signal" or "GPS receipt location").

The map matching apparatus provides map data in which the GPS receipt location map-matched to a road and guides the vehicle along a path based on the map data.

The storage 490 stores map data for nationwide maps. For example, the storage 490 stores data associated with roads.

The storage 490 stores nationwide roads as line-shaped linear data while performing one-to-one matching between the linear data and planar data transformed as images from the linear data.

The linear data may include nodes and links that constitute the roads. The planar data is data for display and has a predetermined width considering an actual width of a road. The planar data may be formed in a plane shape or as polygon data having a stereoscopic shape.

The linear data and the planar data each may be differentiated for each of lanes constituting a road. Even though the linear data is not differentiated, the planar data may be separated for each lane. The planar data may include information on the width of the road and information on the lanes.

The map matching unit 400 performs map matching on the GPS receipt location using the map data stored in the storage 490.

The map matching unit 400 includes a location calculator 410, a location determining unit 420, and a map matching unit 430.

The location calculator 410 receives a GPS signal from the GPS receiver 480 and calculates a location of the GPS signal, for example, a location of the vehicle, based on the GPS signal.

The location determining unit 420 determines whether the location of the GPS signal, which is calculated by the location calculator 410, is within a width of a road.

The location determining unit 420 may load linear data and planar data for roads located around the GPS receipt location from the storage 490 and may use the loaded data to determine the location of the GPS signal.

The location determining unit 420 may determine whether the location of the GPS signal is located within the width of the road by identifying whether the location of the GPS signal is located in the loaded planar data.

Depending on the result of the determination made by the location determining unit 420, the map matching unit 430 performs map matching on the GPS receipt location.

Figure 5:
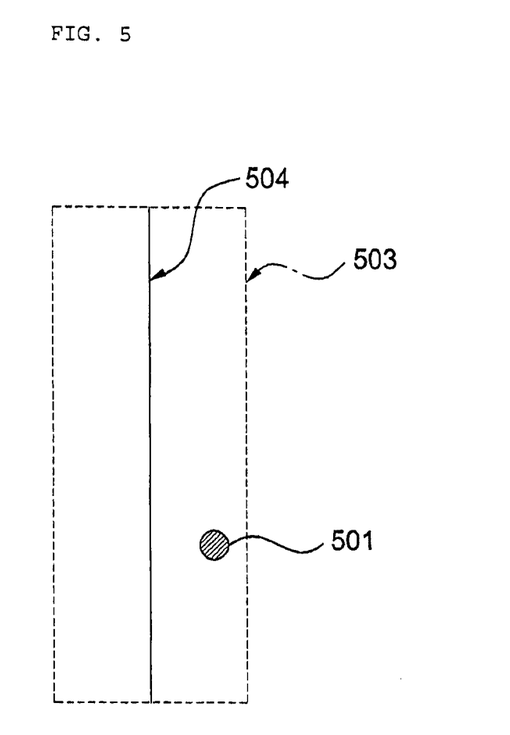
FIG. 5 is a view for describing an example of matching the GPS receipt location.

FIG. 5 is a view for describing an example of matching the GPS receipt location.

Referring to FIG. 5, the map matching apparatus using planar data for roads maps planar data 503 to linear data 504 for roads to provide the linear data 504 as images.

When the GPS receipt location 501 is located within the planar data 503, the map matching unit 430 may map-match the GPS receipt location 501 to the corresponding location. For example, when the GPS receipt location 501 comes within a width range of the planar data 503, the map matching unit 430 matches the GPS receipt location 501 onto the planar data 503 as is.

Accordingly, the present embodiment may conduct map matching directly onto the planar data but not onto the linear data when the GPS receipt location is within the width of the road.

Figure 6:
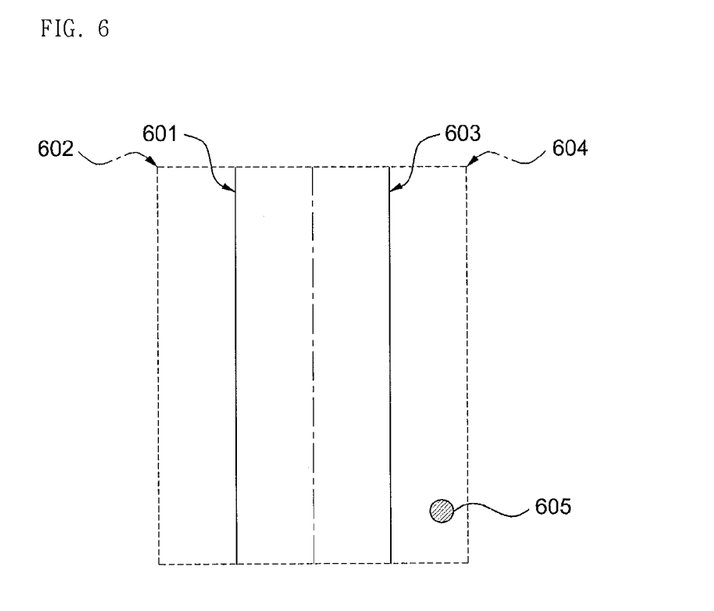
FIG. 6 is a view for describing an example of matching a GPS receipt location.

FIG. 6 is a view for describing an example of matching a GPS receipt location.

Referring to FIG. 6, the map matching apparatus using planar data for roads may differentially constitute planar data 602 and 604 for respective lanes 601 and 603.

When a GPS receipt location 605 is located within planar data 604 corresponding to one 603 of lanes 601 and 603, the map matching unit 430 matches the GPS receipt location 605 onto the planar data 604 for the first lane 603 as is. By performing direct map matching to the planar data for a lane using the planar data differentiated for each lane when the GPS receipt location comes within the width of the lane, the present embodiment may make a more realistic representation as if the vehicle is positioned on the real lane.

Figure 7:
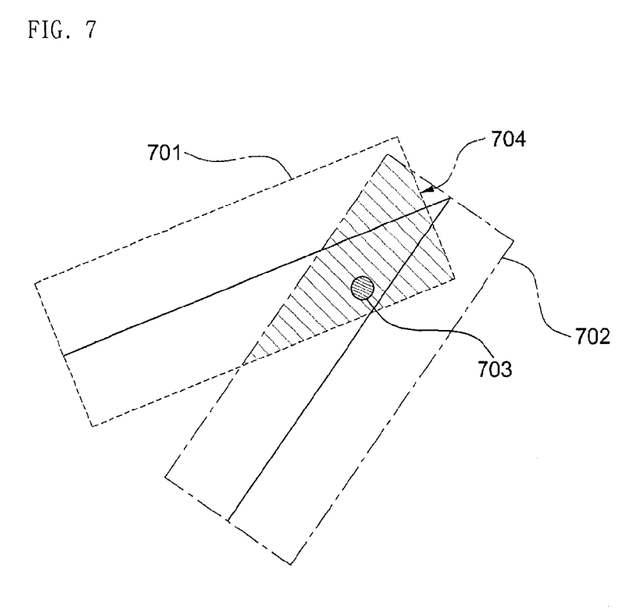
FIG. 7 is a view for describing an example of matching a GPS receipt location.

FIG. 7 is a view for describing an example of matching a GPS receipt location.

Referring to FIG. 7, two roads may cross each other or may be located adjacent to each other, so that planar data 701 and 702 for the roads may overlap each other, thus forming an overlapping area 704.

When a GPS receipt location 703 is located within the overlapping area 704, the map matching unit 430 map-matches the GPS receipt location 703 onto linear data for a road closest to the GPS receipt location among the roads.

As such, the present embodiment may conduct map matching on the GPS receipt location using linear data for roads that cross each other so that their corresponding plans overlap each other or for roads that share planar data.

Figure 8:
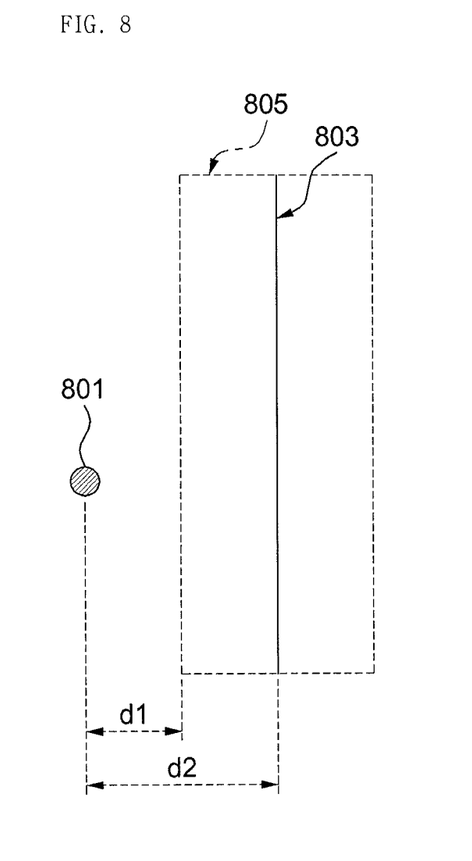
FIG. 8 is a view for describing an example of matching a GPS receipt location.

FIG. 8 is a view for describing an example of matching a GPS receipt location.

Referring to FIG. 8, a GPS receipt location 801 may be located outside a width of a road departing from planar data 805 for the road due to, for example, an error of a GPS signal.

Under this circumstance, the map matching unit 430 conducts map matching of the GPS receipt location 801 using planar data for peripheral roads. For example, the map matching unit 430 may match the GPS receipt location 801 onto planar data 805 for a road closest to the GPS receipt location 801 (that is, a road located away from the GPS receipt location 801 by a distance d1) among planar data for roads located around the GPS receipt location 801.

In the environment where planar data is differentiated for each of lanes of a road, when the GPS receipt location 801 is located off the planar data 805, the map matching unit 430 may match the GPS receipt location 801 onto the planar data 805 for a lane closest to the GPS receipt location 801, that is, a lane located away from the GPS receipt location 801 by the distance d1, among planar data for each of lanes of a road located around the GPS receipt location 801.

When the GPS receipt location 801 departs from the planar data 805, the map matching unit 430 performs map matching of the GPS receipt location 801 using linear data for peripheral roads. The map matching unit 430 may match the GPS receipt location 801 onto linear data 803 for a road closest to the GPS receipt location 801, for example, a road located away from the GPS receipt location 801 by a distance d2, among linear data for roads around the GPS receipt location 801.

Accordingly, the present embodiment may map-matching the GPS receipt location to a road closest to the GPS receipt location by measuring a distance between the GPS receipt location and linear or planar data for the road when the GPS receipt location is off the width of the road.

Figure 9:
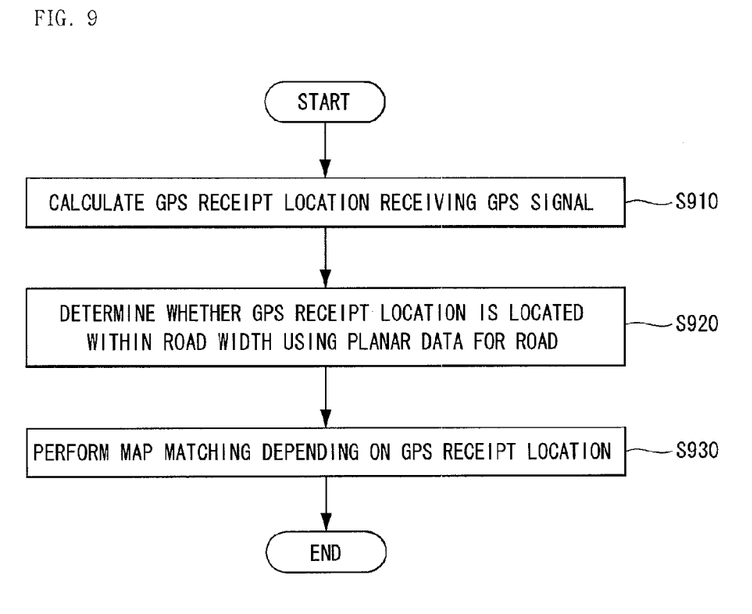
FIG. 9 is a flowchart illustrating a map matching method using planar data for roads according to an embodiment of this document.

FIG. 9 is a flowchart illustrating a map matching method using planar data for roads according to an embodiment of this document. This map matching method may be performed by the map matching apparatus shown in FIG. 4.

Referring to FIG. 9, a map matching method using planar data for roads includes the following steps.

In step S910, the location calculator 410 calculates a GPS receipt location, which is a location of a vehicle receiving a GPS signal, based on the GPS signal.

In step S920, the location determining unit 420 determines whether the GPS receipt location is located within a width of a road using planar data for roads around the GPS receipt location.

In step S920, the planar data for the road may be loaded, and it may be determined whether the GPS receipt location is inside the loaded planar data.

In step S930, the map matching unit 430 performs map matching on the GPS receipt location depending on whether the GPS receipt location is inside the planar data.

In step S930, when the GPS receipt location is inside the planar data for the road, the GPS receipt location is matched onto the planar data as is.

In step S930, when the GPS receipt location is located off the planar data, the GPS receipt location is matched to linear data for a road closest to the GPS receipt location among linear data for roads around the GPS receipt location.

Alternatively, in step S930, when the GPS receipt location is located off the planar data, the GPS receipt location is matched to planar data for a road closest to the GPS receipt location among planar data for roads around the GPS receipt location.

Alternatively, in step S930, when the GPS receipt location is located in an area where planar data for two or more roads overlap each other, the GPS receipt location is matched to linear data for a road closest to the GPS receipt location among linear data for roads.

Alternatively, in step S930, when the planar data is differentiated for each of lanes of a road and the GPS receipt location is located within planar data corresponding to one of the lanes, the GPS receipt location is matched onto planar data for the lane as is.

Alternatively, in step S930, when the planar data is differentiated for each of lanes of a road and the GPS receipt location is located departing from planar data for all of the lanes, the GPS receipt location is matched onto planar data for a lane closest to the GPS receipt location among the planar data for the lanes.

Accordingly, the present embodiment may directly match the GPS receipt location to the planar data but not the linear data using the planar data for the road when the GPS receipt location comes within the road width. Further, the present embodiment may calibrate map matching to a road close to the GPS receipt location using one of linear or planar data for roads on a road where the GPS receipt location fluctuates.

The embodiments of this document may be implemented as programs that may executed by various computer means and recorded in a computer-readable medium. The computer-readable medium may contain a program command, a data file, and a data structure, alone or in a combination thereof. The program recorded in the medium may be one specially designed or configured for the embodiments of this document or one known to those of ordinary skill in the art. Examples of the computer-readable medium may include magnetic media, such as hard disks, floppy disks, or magnetic tapes, optical media, such as CD-ROMs or DVDs, magneto-optical media, such as floptical disks, ROMs, RAMs, flash memories, or other hardware devices that are configured to store and execute program commands. Examples of the program may include machine language codes such as those made by a compiler as well as high-class language codes executable by a computer using an interpreter. The above-listed hardware devices may be configured to operate as one or more software modules to perform the operations according to the embodiments of this document, and vice versa.

According to the embodiments, map matching performance may be enhanced by performing map matching for GPS receipt locations using planar data for roads, thus minimizing map matching errors in the navigation system and enhancing users' reliability.

The embodiments of this document have been explained above with reference to exemplary embodiments. It will be evident to those skilled in the art that various modifications may be made thereto without departing from the broader spirit and scope of the embodiments. Further, although the embodiments have been described in the context its implementation in particular environments and for particular applications, those skilled in the art will recognize that this document's usefulness is not limited thereto and that the embodiments can be beneficially utilized in any number of environments and implementations. The foregoing description and drawings are, accordingly, to be regarded in an illustrative rather than a restrictive sense.

What is claimed is:

1. A map matching apparatus comprising:
a location calculator configured to
receive a GPS (Global Positioning System) signal from a GPS receiver and
calculate a GPS receipt location corresponding to the received GPS signal;
a storage configured to
store linear data that represents roads in a form of line, and
store planer data that represents roads in a form of plane by transforming the linear data based on an actual width of the road;
a location determining unit configured to
load the linear data and the planar data for a road located around the GPS receipt location and
determine whether a GPS receipt location is located within the planar data; and
a map matching unit configured to perform map matching that corrects the GPS receipt location depending on whether the GPS receipt location is located within the planar data and places the corrected GPS receipt location on the road.

2. The map matching apparatus of claim 1, wherein the planar data comprises polygon data for displaying the road in the form of an image.

3. The map matching apparatus of claim 1, wherein the planar data includes information on a width of the road.

4. The map matching apparatus of claim 1, wherein the map matching unit is configured to map-match the GPS receipt location onto the planar data when the GPS receipt location is located within the planar data.

5. The map matching apparatus of claim 1, wherein the map matching unit is configured to map-match the GPS receipt location onto the linear data of a road closest to the GPS receipt location using the linear data for the road when the GPS receipt location is located outside a width of the road.

6. The map matching apparatus of claim 1, wherein the map matching unit is configured to map-match the GPS receipt location onto the planar data of a road closest to the GPS receipt location using the planar data for the road when the GPS receipt location is located outside a width of the road.

7. The map matching apparatus of claim 1, wherein the map matching unit is configured to map-match the GPS receipt location onto linear data for a road closest to the GPS receipt location using the linear data for the road when the GPS receipt location is located in an area where planar data for two or more roads overlap each other.

8. The map matching apparatus of claim 1, wherein the planar data is differentiated for at least one of a plurality of lanes included in the road, and the map matching unit is configured to map-match the GPS receipt location onto planar data for a first lane of the lanes when the GPS receipt location is located within planar data for the first lane.

9. The map matching apparatus of claim 1, wherein the planar data is differentiated for at least one of a plurality of lanes included in the road, and the map matching unit is configured to map-match the GPS receipt location onto planar data for a lane closest to the GPS receipt location using the planar data for the lane when the GPS receipt location is located outside a width of the road.

10. A map matching method comprising:

using a map matching apparatus to perform the map matching method, wherein the map matching apparatus comprises a location calculator, a location determining unit, a map matching unit, and a storing unit, the using of the map matching apparatus comprising;

storing linear data that represents roads in a form of line;

storing planer data that represents roads in a form of plane by transforming the linear data based on an actual width of the road by the storing unit;

receiving a GPS (Global Positioning System) signal and a calculation of a GPS receipt location corresponding to the received GPS signal by the location calculator;

loading the linear data and the planar data for a road located around the GPS receipt location;

determining whether a GPS receipt location is located within the planar data for a road by the location determining unit; and performing map matching that corrects the GPS receipt location depending on whether the GPS receipt location is located within the planar data and places the corrected GPS receipt location on the road by the map matching unit.

11. The map matching method of claim 10, wherein determining, by the location determining unit, the GPS receipt location includes loading linear data and planar data for the road located around the GPS receipt location from a storage storing linear data and planar data for roads in a manner that the linear and planar data are one-to-one matched to the roads, respectively.

12. The map matching method of claim 11, wherein the planar data is polygon data for displaying the road in the form of an image.

13. The map matching method of claim 11, wherein the planar data includes information on a width of the road.

14. The map matching method of claim 11, wherein performing map matching includes map-matching the GPS receipt location onto the planar data when the GPS receipt location is located within the planar data.

15. The map matching method of claim 11, wherein performing map matching includes map-matching the GPS receipt location onto the linear data of a road closet to the GPS location using the linear data for the road when the GPS receipt location is located outside a width of the road.

16. The map matching method of claim 11, wherein performing map matching includes map-matching the GPS receipt location onto the planar data of a road closet to the GPS receipt location using the planar data for the road when the GPS receipt location is located outside a width of the road.

17. The map matching method of claim 11, wherein performing map matching includes map-matching the GPS receipt location onto linear data for a road closest to the GPS receipt location using the linear data for the road when the GPS receipt location is located in an area where planar data for two or more roads overlap each other.

18. The map matching method of claim 11, wherein the planar data is differentiated for at least one of a plurality of lanes included in the road, and performing the map matching includes map-matching the GPS receipt location onto planar data for a first lane of the lanes when the GPS receipt location is located within planar data for the first lane.

19. The map matching method of claim 11, wherein the planar data is differentiated for at least one of a plurality of lanes included in the road, and performing the map matching includes map-matching the GPS receipt location onto planar data for a lane closest to the GPS receipt location using the planar data for the lane when the GPS receipt location is located outside a width of the road.

20. A non-transitory computer readable recording medium storing a program for implementing a map matching method comprising:

using a map matching apparatus to perform the map matching method, wherein the map matching apparatus comprises a location calculator, a location determining unit, a map matching unit, and a storing unit, the using of the map matching apparatus comprising;

storing linear data that represents roads in a form of line;

storing planer data that represents roads in a form of plane by transforming the linear data based on an actual width of the road by the storing unit;

receiving a GPS (Global Positioning System) signal and a calculation a GPS receipt location corresponding to the received GPS signal by the location calculator;

loading the linear data and the planar data a road located around the GPS receipt location;

determining whether a GPS receipt location is located within the planar data for a road by the location determining unit; and performing map matching that corrects the GPS receipt location depending on whether the GPS receipt location is located within the planar data and places the corrected GPS receipt location on the road by the map matching unit.

* * * * *